United States Patent [19]
Lee et al.

[11] Patent Number: 6,049,272
[45] Date of Patent: Apr. 11, 2000

[54] AUTOMATED DATA TRANSMISSION LINK TO LAW ENFORCEMENT AND SECURITY PERSONNEL

[75] Inventors: Christopher Y. Lee; Todd R. Montefusco; Boyd B. Moore; Kevin M. Radabaugh; John C. Risley; Michael D. Smith, all of Houston, Tex.

[73] Assignee: Boyd B. Moore et al., Houston, Tex.

[21] Appl. No.: 08/787,978

[22] Filed: Jan. 22, 1997

[51] Int. Cl.[7] .............................. G08B 1/08; H04M 11/04
[52] U.S. Cl. ........................... 340/539; 340/531; 379/37; 379/38; 379/42
[58] Field of Search ..................................... 340/539, 531, 340/506; 379/37–40, 45, 42, 44, 43

[56] References Cited

U.S. PATENT DOCUMENTS

| | | | |
|---|---|---|---|
| 3,864,674 | 2/1975 | Worsham et al. | 340/539 |
| 4,195,288 | 3/1980 | Morton | 340/539 |
| 4,581,606 | 4/1986 | Mallory | 340/539 |
| 4,724,425 | 2/1988 | Gerhart et al. | 340/539 |
| 4,856,047 | 8/1989 | Saunders | 379/57 |
| 4,887,291 | 12/1989 | Stillwell | 379/39 |
| 4,908,604 | 3/1990 | Jacob | 340/539 |
| 5,195,126 | 3/1993 | Carrier et al. | 379/45 |
| 5,223,844 | 6/1993 | Mansell et al. | 342/357 |
| 5,278,539 | 1/1994 | Lauterbach et al. | 340/539 |
| 5,319,355 | 6/1994 | Russek | 340/573 |
| 5,400,246 | 3/1995 | Wilson et al. | 364/146 |
| 5,446,445 | 8/1995 | Bloomfield et al. | 340/521 |
| 5,534,851 | 7/1996 | Russek | 340/573 |
| 5,550,551 | 8/1996 | Alesio | 342/457 |
| 5,742,233 | 4/1998 | Hoffman et al. | 340/825.49 |

*Primary Examiner*—Donnie L. Crosland
*Attorney, Agent, or Firm*—Fulbright & Jaworski, L.L.P.; Paul E. Krieger

[57] ABSTRACT

An automated data transmission system for communicating warning signals and other information directly to law enforcement or security personnel in order to reduce response times. In the disclosed embodiment of the invention, sensing circuitry is added to a standard security system installed at an industrial or residential site. The sensing circuitry detects activation of the security system by sensing an outgoing warning call. Following activation of the security system, an automatic dialer or other automated transmitter circuitry is used to initiate a call to a processing computer at a predetermined phone number. The processing computer utilizes Caller ID™ information to determine the phone number assigned to the automatic dialer. The processing computer also maintains a database that associates assorted pieces of information with each phone number in the list, including the key map code location of the business, address of the protected business, name, date and time, and the phone number of a company contact. This information is communicated, through a paging service provider, to a dedicated group of one or more alphanumeric paging devices. The group of dedicated paging devices is provided to the law enforcement personnel assigned to protect the geographic region in which the secured industrial or residential site is located. Time-consuming human involvement in the notification process is thereby eliminated.

16 Claims, 4 Drawing Sheets

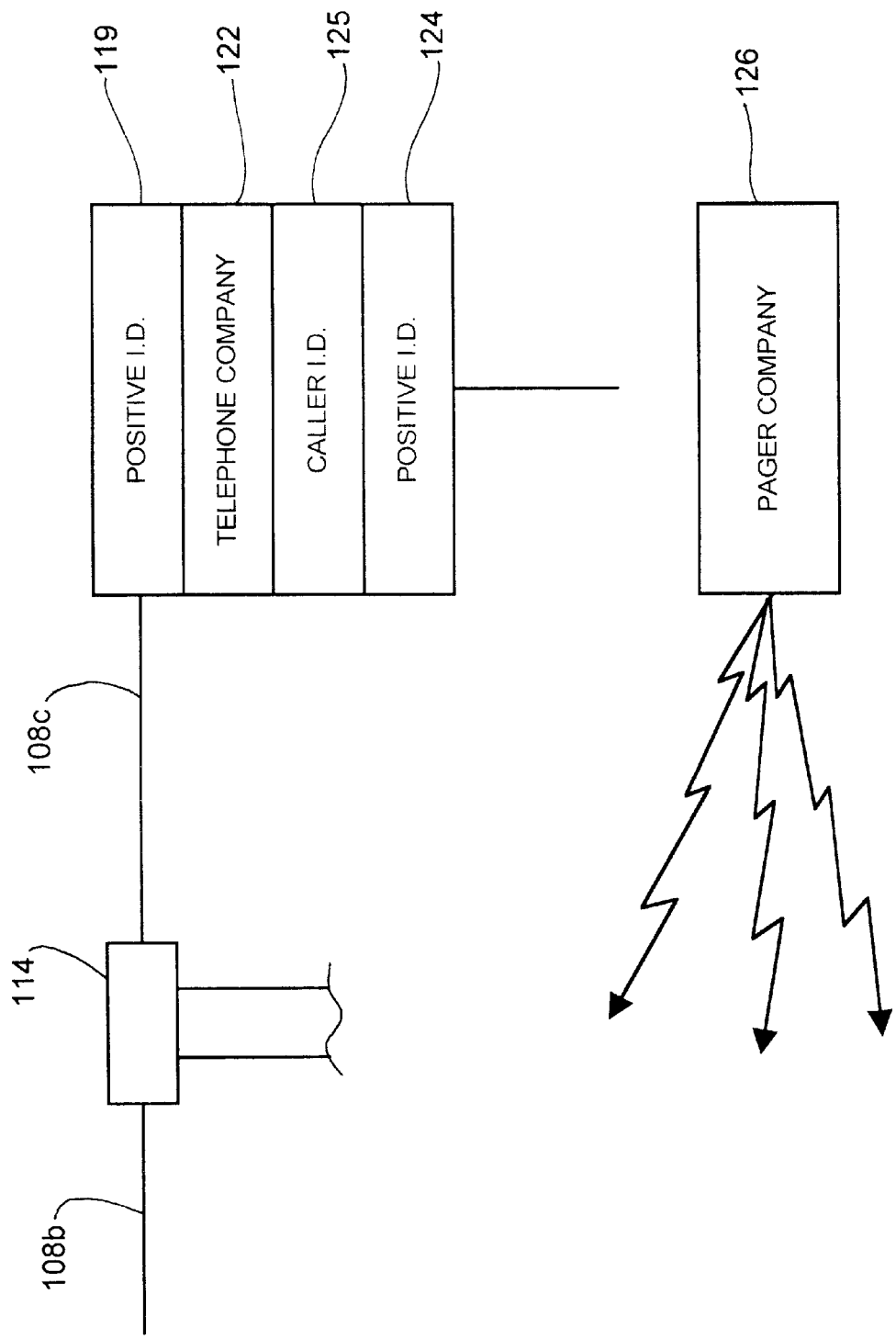

AUTOMATED DATA TRANSMISSION LINK TO LAW ENFORCEMENT AND SECURITY PERSONNEL

BACKGROUND OF THE INVENTION

1. Field of the Invention

The present invention relates to a system and method for reducing law enforcement response times by utilizing an automated data transmission system to communicate warning signals and other information directly to law enforcement or security personnel, instead of going through a dispatcher or other intermediaries.

2. Description of the Related Art

Industrial business sites are a frequent target of theft. Many businesses are left deserted at night, weekends and holidays, especially smaller businesses without night-time security personnel. To make matters worse, many industrial sites are located in relatively remote areas, and often house expensive and easily transported machinery. Computers and other electronics, for example, are readily resold and male lucrative targets for burglars. The loss of such equipment and the data it contains can result in a great deal of disruption to a business.

To combat industrial theft, many businesses rely on access and security systems maintained by a security service provider. These security systems, while generally effective, are not without shortcomings. In a typical operation, a security system with various sensors (such as motion sensors and smoke detectors) is installed at the "secured" site. The security system is typically connected to at least one phone subscriber line. Following detection of an intruder or other emergency event, the security system is configured to communicate a warning signal to the security service provider via an automatic telephone call or radio message.

Warning calls placed to the security service provider are handled by an operator or employee of the service provider. After determining the nature and location of the warning call, the security service provider employee relays the pertinent information to a law enforcement phone operator. In turn, the law enforcement phone operator relays the information to a law enforcement dispatcher. The dispatcher functions to communicate the information to the law enforcement personnel assigned to cover the geographic region (typically referred to as a "zone") in which the industrial site is located. The same procedure is generally followed when an intruder is detected in a secured residential site. Frequently, however, because of the time this procedure takes, the intruders have left the scene by the time law enforcement personnel are able to respond.

Numerous factors add to the sometimes lengthy response times. First, the operators who handle calls for the security service providers are often overworked and/or undertrained. After receiving a telephone or radio warning call from a security system, the operators may waste precious time deciphering the warning message before communicating it to the law enforcement phone operator. Occasionally, inaccurate information is conveyed due to human error. In addition, security service providers are not allowed a separate direct line to the police department—they must use the law enforcement emergency line that is frequently busy during peak hours. Delays of over ten minutes in completing such a call are not uncommon.

Additional delay arises due to the finite amount of time required for the law enforcement phone operator to relay the warning information to the dispatcher, and for the dispatcher to relay the information to the appropriate group of patrol cars (i.e. the cars assigned to the zone in which the secured site is located). Again, the problem is exacerbated during peak crime hours when numerous calls can be received by the dispatcher in a short period of time.

Further, sophisticated criminals have devised methods of circumventing traditional security measures. For example, many savvy burglars carry portable police scanners. When the police dispatcher relays a call to patrol cars, the burglars are able to intercept the communication and time their departure accordingly. It would therefore be desirable to devise a system wherein warning signals and other information are communicated to cars or other security personnel via secure means that bypass communications over normal police channels. Such a system would ideally also eliminate the possibility of human error in communicating the pertinent information.

Various schemes have been devised for automatically notifying authorities of an emergency. Most of the proposed solutions involve extensive use of the public switched telephone network (PSTN) and eventual human intervention in determining how to decipher and forward the emergency information. In addition, automated paging and telemetry systems, such as those disclosed in U.S. Pat. No. 4,856,047 issued to Saunders and U.S. Pat. No. 4,887,291 issued to Stillwell, generally disclose automated communication of a message via a paging system. However, use of such systems to reduce human intervention in deciphering warning information to improve law enforcement response times is not shown or known in the prior art.

SUMMARY OF THE INVENTION

Briefly, the present invention improves response times to an intruder warning signal by using an automated data transmission system to expeditiously communicate warning signals and other information directly to the appropriate law enforcement personnel. In the preferred embodiment, a standard security system is installed by a security service provider in an industrial or residential site. The standard security system includes numerous sensors to detect a wide variety of abnormal activity indicative of an emergency event.

In accordance with the invention, additional circuitry is added to an existing security system without modifying or altering the operation of the existing security system. The additional circuitry includes a passive Hall effect sensor(s) or similar device capable of detecting activation of the security system by sensing an outgoing warning call or audible alarm. The Hall effect sensor is coupled to an automatic dialing device or other automated transmitter circuitry. Following activation of the security system, the Hall effect sensor functions to activate the automatic dialing device, which is configured to initiate a call to a predetermined phone number.

In one embodiment, the automatic dialer dials the number of a processing computer capable of utilizing Caller ID™ information to determine the phone number assigned to the automatic dialer. Each automatic dialer monitored by the processing computer has an associated phone number that is part of a phone number list. The processing computer maintains a database that associates assorted pieces of information to each automatic dialer phone number on the list. This information can include time and date of the call, the name and address of the protected business, the key map code location of the business, and the name and phone number of a company contact. The database also associates a set of one or more pager numbers with the phone number for each automatic dialer.

Upon determining the phone number of the activated automatic dialer, the processing computer encodes the information associated with that number using a protocol that is known to a specified paging company. The encoded information, including the set of pager numbers, is then communicated via modem to the paging company. If the security system is provided by a telephone company, it can be programmed to guarantee that only certain authorized phone numbers are allowed to connect to the paging company's incoming phone line.

One or more dedicated alphanumeric paging devices are carried by the law enforcement personnel assigned to protect the zone in which the secured industrial or residential site is located. The paging devices can be provided to patrol cars assigned to patrol the zone, to on-site security personnel, or both. The alphanumeric pagers of the preferred embodiment include a lighted liquid crystal display (LCD) or other similar electronic display capabilities allowing written messages, including words and numbers, to be communicated in a wireless manner. Alternatively, a digital phone incorporating paging-type communication capabilities could be utilized.

The alphanumeric paging devices are configured by the paging service provider to respond to the same paging number or individually to the set of pager numbers provided by the processing computer. After receiving a packet of information from the processing computer, the paging company transmits a message to each paging device in the specified group, relaying pertinent information regarding the nature and location of the suspected illicit activity. By circumventing time-consuming human involvement in communicating emergency information to law enforcement personnel, a system according to the present invention allows for significantly faster response to emergency events in protected geographic zones. Further, because the emergency dispatch call is not transmitted over standard police radio channels, burglars cannot gain an advantage by using a police scanner to estimate response times.

As will be shown, the invention is capable of numerous other and different embodiments and applications, and various details of the invention are capable of modifications without departing from the spirit of the invention as set forth in the appended claims, nor exceed the scope thereof. Accordingly, the drawings and descriptions are to be regarded as illustrative in nature, and not as restrictive.

BRIEF DESCRIPTION OF THE DRAWINGS

A better understanding of the present invention can be obtained when the following detailed description of the preferred embodiment is considered in conjunction with the following drawings, in which:

FIG. 4 is a functional work diagram of an alternative embodiment of the invention where a telephone company administers the system.

DETAILED DESCRIPTION OF THE PREFERRED EMBODIMENT

Figure 1:
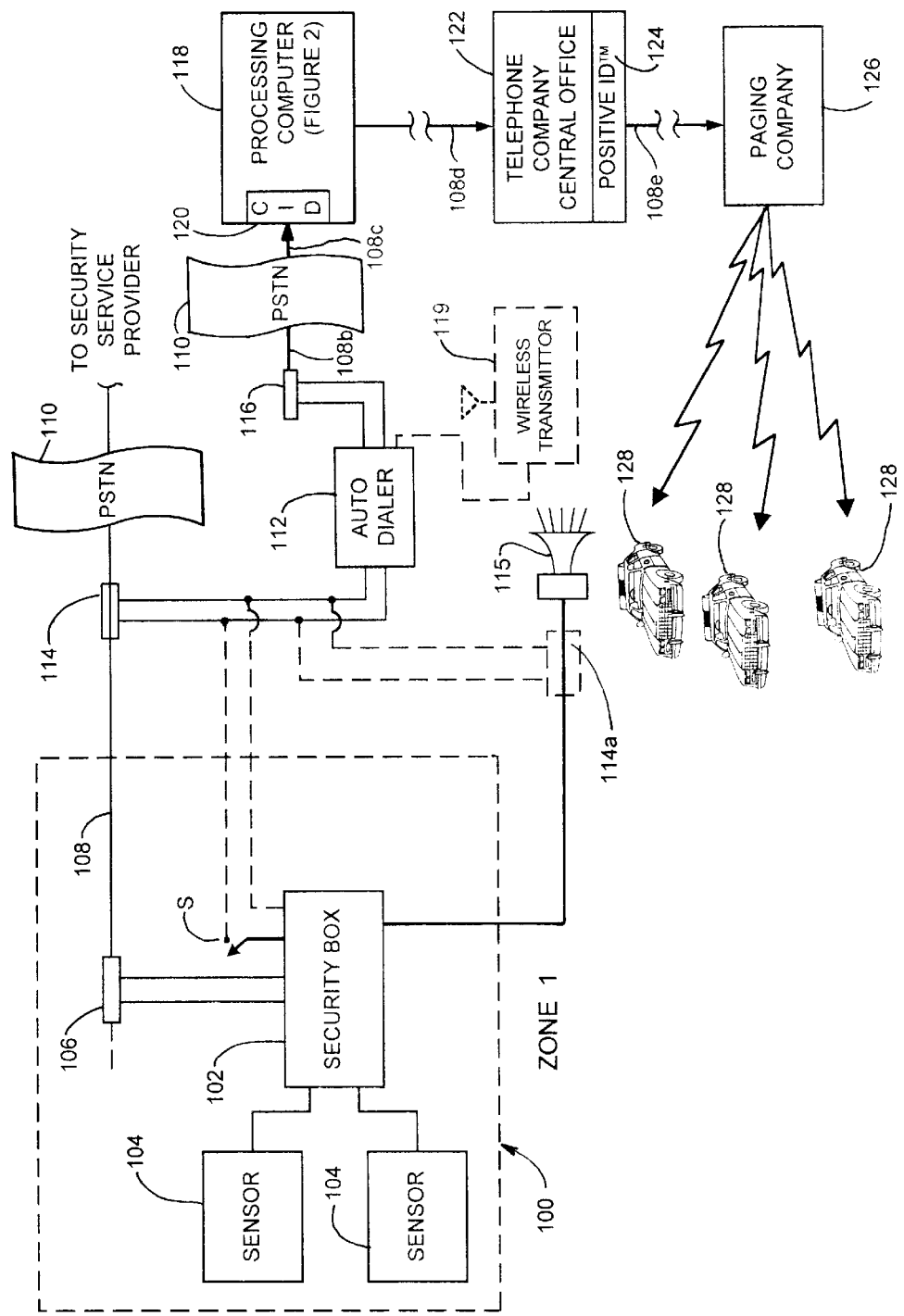
FIG. 1 is a functional block diagram of an automated data transmission system according to the present invention.

Referring now to FIG. 1, a functional block diagram of an automated data transmission system for law enforcement personnel according to the present invention is shown. The automated data transmission system is preferably installed in parallel with standard security systems, but alternatively could be used in place of these security systems. The system shown in FIG. I enhances the security provided by standard security systems and greatly reduces law enforcement personnel response times.

As shown, a standard security system 100 is used to secure a residential or industrial site in a specified region (Zone 1). The standard security system 100 generally includes one or more security control boxes 102 which contain an automatic dialing device and message generator. The security control box 102 interfaces with a group of sensors 104. The sensors 104 are generally configured to detect a wide variety of abnormal activities associated with an intruder or other emergency condition. For example, motion sensors, temperature sensors, and other sensors capable of detecting an opened window or door are commonly employed. If more than one security control box 102 is used, one could monitor the inside of a building while another could monitor the surrounding property, including the perimeter of the secured site.

As is common with security systems 100, the security control box 102 is coupled to a subscriber line 108 (also referred to as a loop) via an USOC RJ31 alarm interface 106 or similar telephone line connection. The subscriber lines 108 is used to communicate emergency information to the security service provider (not shown), usually through the Public Switch Telephone Network (PSTN) 110. The security control box 102 is configured to receive information from the sensors 104 and analyze the information to determine whether a predefined condition exists. If an abnormal condition is detected, information regarding the nature and location of the intrusion is converted into a format utilized by the security service provider. Typical protocols used by security service provides include contact ID, Modem-2, and SIC4+2, among others.

The automated data transmission system shown in FIG. 1 is designed to operate in parallel with the standard security system 100, and eliminate delays that are normally associated with standard security systems. In the disclosed embodiment, a sensor such as a passive, non-contact Hall effect device or inductive coupler 114 is coupled to the subscriber line 108. The Hall effect device 114 is capable of detecting activation of the security system by monitoring the subscriber lines 108 for magnetic fields and currents indicative of communications to the security service provider. Alternatively, a Hall effect device 114a, illustrated by broken lines, could be configured to detect activation of the security system 100 directly by sensing current to an alarm such as an electrical horn or siren 115. A sound or light activated switch (not shown) or other passive sensing devices could also be used. It is also contemplated that activation of the security system 100 could be monitored by dry contact switches such as the one designated by reference letter S, also illustrated by broken lines, connected directly to the security control boxes 102.

However, Hall effect devices 114 are preferred due to the fact that the subscriber lines 108 need not be broken in order to detect transmissions. Such use of Hall effect devices 114 or any other similar non-contact sensors does not require any physical alterations to the existing security system 100. Operation of the existing security system 100 is also not affected in the preferred embodiment of the invention, thereby reducing reliability concerns.

Each of the Hall effect devices 114 is individually coupled to an automatic dialing device 112. As is known in the art, the automatic dialer 112 is utilized to automatically dial a predetermined number or data port following reception of an actuation signal. In the disclosed embodiment, the automatic dialer 112 is coupled to a subscriber line 108b via a dedicated USOC RJ31 alarm interface 116 or similar known telephone line connection.

In operation, an emergency event is detected by one or more sensors 104, causing security control box 102 to communicate a warning signal over a subscriber line 108. This warning signal is detected by the Hall effect device 114, which communicates an actuation signal to the automatic dialer 112. Upon being activated, the automatic dialer 112 dials a phone number which has been entered into its memory. The predetermined phone number dialed by the automatic dialer 112 corresponds to a processing computer 118 or other computing device. Communications between the automatic dialer 112 and the processing computer 118 are transmitted over a subscriber line 108c to a PSTN 110, which connects the call to the processing computer 118 via another subscriber line 108c.

Figure 2:
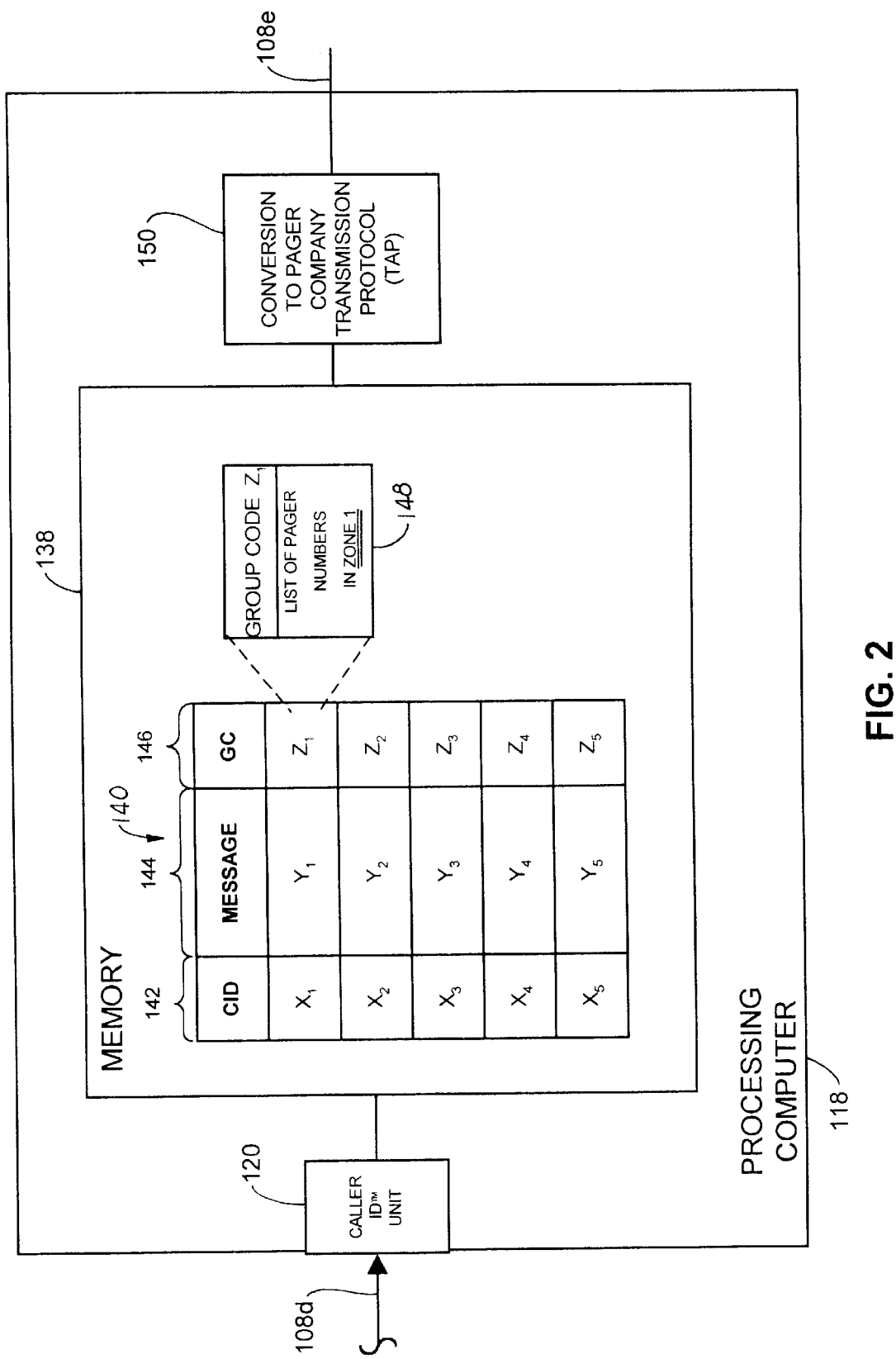
FIG. 2 is a block diagram illustrating the capabilities and database contents of a processing computer according to the present invention.

Referring to FIG. 2, the processing computer 118 is preferably capable of Caller ID™ recognition, generally designated by reference numeral 120. Caller ID™ information, as is known to those skilled in the art, allows the processing computer 118 to determine the phone number of the originating automatic dialer 112. Each automatic dialer 112 that contacts the processing computer has an associated phone number X1–X5 that is part of a phone number list 142. The phone number list 142 is part of a larger database 140 maintained within memory 138 of the processing computer 118.

The database 140 associates assorted pieces of information with each phone number in the phone number list 142. This information is represented as message list 144. Each entry Y1–Y5 in the message list 144 includes information important to the operation of the system. Preferably for the security system described, this information can include the name and address of the corresponding business or residential site, the Key map location of the protected site, and the name and phone number of a company contact.

The database 140 also associates an entry Z1–Z5 in a group code list 146 with each auto dialer phone number Z1–Z5. As schematically detailed in element 148 of the database 140, each group code entry Z1–Z5 corresponds to one or more pager numbers to be dialed when an emergency event occurs at a specific protected site. The group codes effectively identify the zone in which the protected site is located.

The processing computer 118 is programmed to determine whether the phone number associated with a received phone call is contained within the phone number list 142. If so, all information corresponding to the phone number is converted into a pager company transmission protocol as shown in information block 150. In the preferred embodiment, information contained within the database 140 is converted into the Telocator Alphanumeric Input Protocol (TAP) prior to being downloaded to a paging company 126 (FIG. 1). This protocol was originally developed to decrease holding times on input lines to alphanumeric systems by allowing off-line entry of paging information to be rapidly communicated to a central paging terminal after connection. The protocol was known as the IXO Alphanumeric Protocol until it was adopted for the input of paging requests. The TAP protocol can be used in either a dedicated or a dial-up telephone line configuration. Details of the conversion to the TAP protocol are known to those skilled in the art.

Returning to FIG. 1, communication of the encoded emergency information for display on a dedicated group of paging devices 152 is now described. After the processing computer 118 has converted the appropriate emergency information for transmission, the information is communicated over a subscriber line 108d to subscriber line interface circuitry within a telephone company central office 122. The preferred embodiment of the invention utilizes a security system known as Positive ID™ 124 to restrict modem-based access to the paging company 126.

Use of Positive ID™ enables the paging company 126 to create predefined authorization profiles specifying the incoming calls that are allowed to access its phone number. The paging company 126 can establish a list of phone numbers and a list of access codes that are allowed to complete a call to a specified number. Calls from phone numbers that have been authorized for clearance are allowed to gain access, while all other calls are denied. Use of Positive ID™ 124 decreases the possibility of unauthorized access to the paging company 126. Positive ID™ is effective in situations in which the dial-up line is a non-dedicated communications line in which a connection is established by dialing the number and access code associated with the destination. The system works with any access arrangement where one system gains access to another via dial-up through a public switch network 110. Authorized phone numbers can be changed, expanded, or updated via a PC interface at any time, or in emergency situations via a touch tone input system.

Assuming the paging company 126 has authorized a telephone call to be received from processing computer 118, the telephone company central office 122 forwards the encoded emergency information to the paging company 126 via subscriber line 108e. Based on information provided by the processing computer 118, the group or zone of paging devices 152 (FIG. 3) will be provided with the emergency information via a paging transmitter (not shown). In the disclosed embodiment, the paging devices 152 are in the possession of law enforcement or security personnel in patrol cars 128. Pagers could also be provided to law enforcement or security personnel on foot, bicycles, horses or other modes of transportation. Preferably, each officer assigned to a particular zone is equipped with his or her own paging device 152. If the number of paging devices 152 is limited, however, law enforcement personnel could simply pass off the devices as shifts are rotated.

Paging companies and Personal Communications Service (PCS) providers generally use the radio spectrum instead of wires to transmit communications to a paging devices 152. The advent of alphanumeric pagers has allowed service providers to transmit short messages to subscribers using paging protocols as an alternative to telephony. Many new advanced paging protocols have emerged. One such protocol is the Flex paging protocol developed by Motorola Inc. Other common pager protocols contemplated for use with the invention include POCSAG and ERMES.

Figure 3:
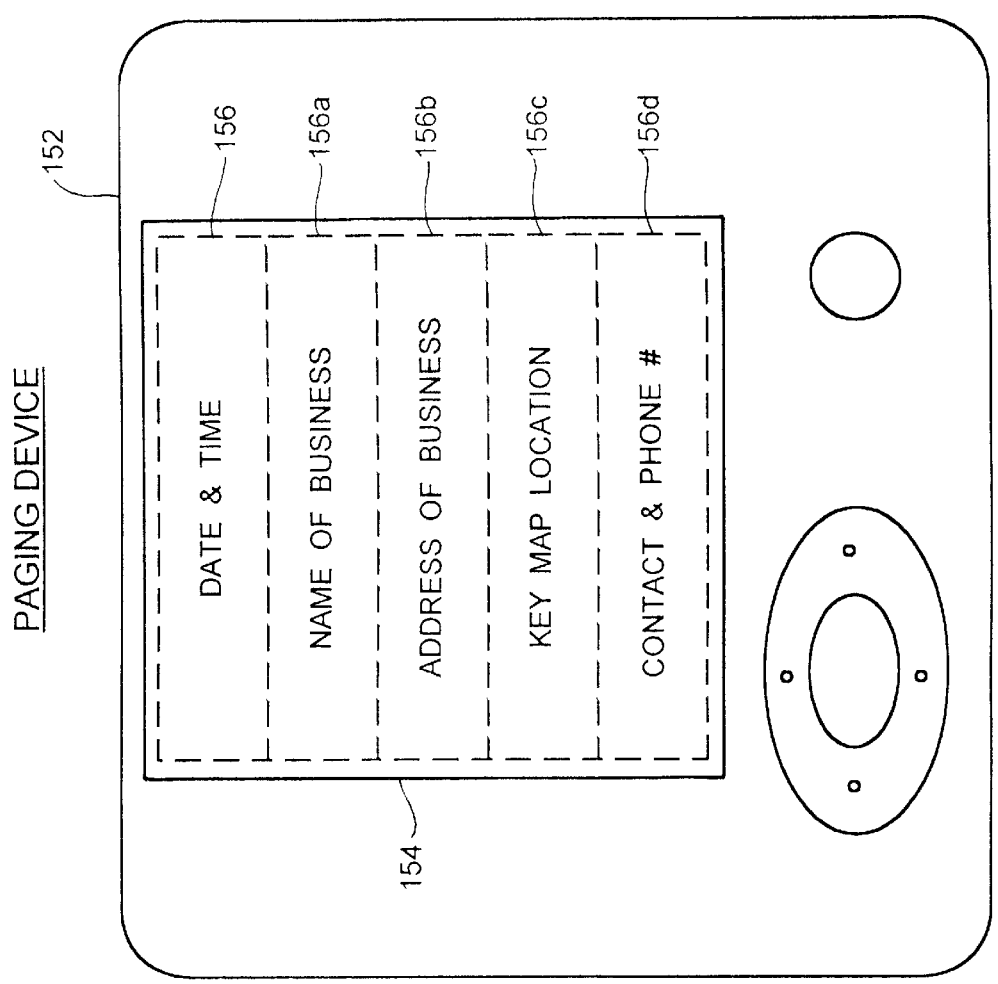
FIG. 3 is an representation of an exemplary alphanumeric paging device display in accordance with the invention.

Referring now to FIG. 3, each alphanumeric paging device 152 of the disclosed embodiment is capable of displaying written messages, including words and numbers, on an electronic display 154. The electronic display 154 of the paging device 152 can preferably display at least 80 characters on a total of 4 lines. The electronic display 154 provides law enforcement personnel with the assorted emergency information as provided by the processing computer 128. In particular, examples of information that can be communicated include the date and time 156, the name of the protected residential or industrial site 156a, the address of the site 156*b,* the Key map location of the site 156*c,* and the name of a contact and his/her phone number 156*d* for alerting the property owner of a potential problem. The information communicated by the display 154 allows the appropriate law enforcement personnel to quickly determine the zone and location of the industrial or residential site whose security system 100 has been triggered.

Preferably, each paging device 152 used in a particular zone can be coded by the paging company 126 to respond to a single paging number. Alternatively, the alphanumeric paging devices 152 in a given zone are configured by the paging company 126 to individually respond to the one number in the set of pager numbers provided by the processing computer 152.

Numerous modifications and alternatives to the disclosed embodiment can be made. For example, the processing computer 118 could be located at the secured industrial or residential site, eliminating the need for subscriber lines 108*b* and 108*c.* Alternatively, emergency information from the secured site could be communicated to the processing computer 118 via wireless communications using a protocol such as cellular data packet data (CDPD). With the CDPD standard, short bursts of data—packets—like addresses and telephone numbers are transmitted over idle cellular voice channels using a cellular phone module or computing device with a CDPD modem. CDPD utilizes the popular Internet protocol and can provide connectionless communications across a cellular network. CDPD is therefore well suited for transactions-based traffic such as database inquiries, dispatch and telemetry.

As mentioned, a digital phone incorporating paging-type communication abilities could also be used as the paging device 152. Specifically, numerous U.S. carriers are deploying handsets with Short Messaging Service (SMS) capabilities based on various transmission technologies (such as CDMA, TDMA, and PCS-1900). SMS permits text messages to be displayed on digital phone handsets. Today's SMS handsets are capable of supporting 9.6 Kbps data transmission with up to 225 characters per message—sufficient for purposes of the present invention.

In another embodiment of the invention, shown in FIG. 4, the processing computer 118 can be eliminated and replaced by Positive I.D.® 119 if the system is administered by a telephone company that offers the service. Once the telephone company's Positive I.D. identifies the number of the automatic dialer 112 as one that is authorized to call the pager number, the information in the telephone company's computer programmed for the number of the automatic dialer is sent directly to the pagers through the telephone company's Caller I.D.® 125, eliminating the need for a separate paging company.

In another contemplated embodiment of the invention, the processing computer 118 is maintained by the paging company 126, such that the auto dialer 112 communicates directly with the paging company 126 through a telephone company central office 128. Alternatively, a direct paging method could be utilized wherein the paging transmitter is a dedicated unit placed at the secured industrial or residential site. The paging company 126 is not utilized in this embodiment of the invention, and the processing computer is located at the secured site. Transmitter power generally determines the geographic area covered by this embodiment of the invention.

In yet another embodiment of the invention, two-way acknowledgement paging is utilized to allow the system to determine the identity of law enforcement personnel who are actually responding to a warning signal. Suitable two-way messaging and paging protocols include Motorola's proprietary ReFlex protocol and pACT (personal Air Communications Technology), an open protocol that operates in the newly established Narrowband PCS (N-PCS) frequencies and is supported by numerous vendors. The pACT protocol is a derivative of CDPD optimized for two-way paging and short messaging applications.

Thus, an automated data transmission system for law enforcement personnel has been described. The data transmission system is capable of detecting an emergency event at a residential or industrial site and conveying pertinent information regarding the nature and location of the emergency event or suspected illicit activity to each pager in a specified group. By circumventing the time-consuming human involvement typically required to communicate emergency information to law enforcement personnel, near immediate response times are possible. Further, because an emergency dispatch call is not transmitted over standard police radio channels, burglars cannot gain an advantage by using a police scanner to estimate response times.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. An automated data transmission system for alerting law enforcement or security personnel to an activated security system, the automated data transmission system comprising:

a sensor coupled to said security system for detecting a signal generated as a result of an emergency event and generating an activation signal in response to the emergency event;

an automated transmitter coupled to said sensor, said automated transmitter automatically initiating a call to a predetermined phone number or data port in response to said activation signal;

a processing computer configured to receive communications at said predetermined phone number or data port, said processing computer programmed to recognize and associate emergency information with the phone number assigned to said automated transmitter, wherein said emergency information includes at least one pager number and information related to the location of said security system;

a paging transmitter communicatively coupled to said processing computer to receive said emergency information; and a group of one or more paging devices responsive to said paging transmitter and operable to receive and display relevant portions of said emergency information, wherein said paging transmitter transmits said emergency information to said group of paging devices assigned to said at least one pager number.

2. The data transmission system of claim 1, wherein said group of at least one paging devices is distributed to law enforcement or security personnel assigned to protect a geographic region in which the security system is located.

3. The data transmission system of claim 1, further comprising additional sensors and automated transmitters for initiating calls to the predetermined phone number in response to emergency events detected by additional security systems, wherein said processing computer is further programmed to recognize and associate emergency information with the phone number(s) assigned to said additional automated transmitters.

4. The data transmission system of claim 1, wherein said relevant portion of said emergency information includes information relating to the location of said security system.

5. The data transmission system of claim 1, wherein said relevant portion of said emergency information includes a contact phone number.

6. The data transmission system of claim 1, wherein said sensing circuitry includes a passive sensor to detect the emergency event.

7. The data transmission system of claim 1, wherein said sensing circuitry includes dry contact switches to detect the emergency event and generate said activation signal.

8. The data transmission system of claim 1, wherein said processing computer receives communications from said automated transmitter via a standard subscriber line.

9. The data transmission system of claim 1, wherein said processing computer receives communications from said automated transmitter via wireless communications.

10. The data transmission system of claim 1, wherein said paging transmitter and said processing computer are communicatively coupled via a telephone company central office utilizing Positive ID™ to control the incoming calls that are allowed to activate said group of at least one paging devices.

11. The data transmission system of claim 1, wherein the automated transmitter and processing computer are communicatively coupled via a telephone company central office utilizing Positive I.D.® to control the incoming calls that are allowed to activate said group of at least one pager claims.

12. The data transmission system of claim 1, wherein said paging device is a digital alphanumeric pager.

13. The data transmission system of claim 11, wherein said digital alphanumeric pager incorporates two-way acknowledgement paging capabilities.

14. The data transmission system of claim 1, wherein said paging device is a digital phone incorporating paging capabilities.

15. A method for alerting law enforcement personnel to an activated security system, comprising the steps of:
   detecting activation of the security system;
   activating an automated transmitter in response to activation of the security system, wherein the automated transmitter is configured to automatically dial a predetermined phone number or data port upon activation;
   utilizing a computer identified with the predetermined phone number or data port to determine the location of the automated transmitter and associate emergency information with the activated security system, wherein the emergency information includes one or more pager numbers and information related to the location of said security system;
   communicating the emergency information to a paging transmitter; and
   transmitting portions of the emergency information via the paging transmitter for display on a group of one or more paging devices responsive to the one or more pager numbers.

16. The method of claim 15, wherein prior to said step of transmitting portions of the emergency information, the group of at least one paging devices is distributed to law enforcement personnel assigned to protect a geographic region in which the activated security system is located.

* * * * *